United States Patent
Lee et al.

(10) Patent No.: US 6,551,367 B2
(45) Date of Patent: Apr. 22, 2003

(54) PROCESS FOR PREPARING METAL OXIDE SLURRY SUITABLE FOR SEMICONDUCTOR CHEMICAL MECHANICAL POLISHING

(75) Inventors: Kil Sung Lee, Seoul (KR); Jae Seok Lee, Euiwang-Shi (KR); Seok Jin Kim, Seoul (KR); Tu Won Chang, Taejon-Shi (KR)

(73) Assignee: Cheil Industries Inc. (KR)

( * ) Notice: Subject to any disclaimer, the term of this patent is extended or adjusted under 35 U.S.C. 154(b) by 2 days.

(21) Appl. No.: 09/867,522

(22) Filed: May 31, 2001

(65) Prior Publication Data
US 2001/0034979 A1 Nov. 1, 2001

Related U.S. Application Data

(63) Continuation-in-part of application No. 09/446,915, filed as application No. PCT/KR99/00123 on Mar. 19, 1999, now abandoned.

(30) Foreign Application Priority Data

Sep. 22, 1998 (KR) .............................. 98-39212

(51) Int. Cl.⁷ ............................. C09K 3/14; C09G 1/02; C09G 1/04
(52) U.S. Cl. ............................. 51/309; 51/307; 51/308; 106/3
(58) Field of Search .................... 51/307, 308, 309; 106/3; 438/692, 693; 451/38; 423/608, 263, 335

(56) References Cited

U.S. PATENT DOCUMENTS

| | | | |
|---|---|---|---|
| 5,342,609 A | 8/1994 | Meeh et al. | 424/9 |
| 5,382,272 A | 1/1995 | Cook et al. | 51/293 |
| 5,904,159 A | 5/1999 | Kato et al. | 134/7 |
| 5,967,964 A | * 10/1999 | Hattori et al. | 241/16 |

FOREIGN PATENT DOCUMENTS

| | | |
|---|---|---|
| EP | 0 773 270 A2 | 5/1997 |
| WO | WO 97/474430 | 12/1997 |

* cited by examiner

*Primary Examiner*—Michael Marcheschi
(74) *Attorney, Agent, or Firm*—Blank Rome LLP

(57) ABSTRACT

There is disclosed a process for preparing a metal oxide CMP slurry suitable for semiconductor devices, wherein a mixture comprising 1 to 50 weight % of a metal oxide and 50 to 99 weight % of water is mixed in a pre-mixing tank, transferred to a dispersion chamber with the aid of a transfer pump, allowed to have a flow rate of not less than 100 m/sec by pressurization with a high pressure pump, and subjected to counter collision for dispersion through two orifices in the dispersion chamber. The slurry has particles which are narrow in particle size distribution, showing an ultrafine size ranging from 30 to 500 nm. Also, the slurry is not polluted at all during its preparation and shows no tailing phenomena, so that it is preventive of $\mu$-scratching. Therefore, it can be used in the planarization for shallow trench isolation, inter-layer dielectrics and inter metal dielectrics through a CMP process.

11 Claims, 1 Drawing Sheet

PROCESS FOR PREPARING METAL OXIDE SLURRY SUITABLE FOR SEMICONDUCTOR CHEMICAL MECHANICAL POLISHING

CROSS REFERENCE TO RELATED APPLICATION

This application is a continuation-in-part application of application Ser. No. 09/446,915, filed on Dec. 29, 1999, Abn which in turn is a 371 from PCT/KR99/00123 filed Mar. 19, 1999 and claims priority of Korean Application 98-39212 filed Sep. 22, 1998, all of said applications being incorporated herein by reference in their entireties.

BACKGROUND OF THE INVENTION

1. Field of the Invention

The present invention relates, in general, to a process for preparing a metal oxide slurry useful in semiconductor chemical mechanical polishing (CMP) and, more particularly, to use of the counter collision of a metal oxide slurry by injecting it from two orifices which are designed to face each other at a high speed, whereby the metal oxide slurry can be allowed to be narrow in particle size distribution and superior in dispersion stability and polishing rate in addition to showing an exceptionally decreased $\mu$-scratch frequency.

2. Description of the Prior Art

A CMP process, a kind of lithography, is utilized in fabricating semiconductors. As semiconductors become miniaturized with denser populations to more complex multilayer structures, planarization, which can be attained by the CMP process, is indispensable for the high integration of semiconductors.

To be useful in the CMP process, generally, metal oxide slurry is required to show excellent dispersibility and polishing rate as well as to leave as few defects, such as $\mu$-scratches, after polishing, as possible, in addition to being high in purity.

All of these requirements, except for purity, are closely concerned with the particle size and distribution of the metal oxide. In regard to the particle size, smaller particles are preferable because they show better dispersion stability and provide fewer $\mu$-scratches, but are disadvantageous in polishing efficiency because the smaller the particles are, the slower the polishing rate is. In an aspect of particle size distribution, of course, the particles are preferably distributed in a narrow size range. In other words, the particles more uniform in size bring about better polishing results. For example, when using slurry with a broad range of particle sizes, the abraded surface is poor in flatness and has a significant amount of $\mu$-scratches thereon.

Thus, when selecting the particle size and size distribution of slurry for CMP, account must be taken of polishing rate, dispersion stability and $\mu$-scratch frequency.

U.S. Pat. No. 5,382,272 discloses a preparation process of polishing compositions which exhibit high polishing rates. The compositions are based on $SiO_2$ and used to polish Si wafers. The compositions are prepared by blending silica and deionized water in a high speed mixer and agitating them in an agitator mill which contains a mill medium (bead). It is written that the base abrasive is activated by addition of a second cation, such as $Ce^{4+}$ and $Zr^{4+}$, so that the polishing rate is enhanced. The process disclosed in this patent suffers from disadvantages. The beads are inevitably polluted during the dispersion which is accomplished by the collision between the abrasive and the bead. In addition, a tailing phenomenon occurs, making it difficult to produce a slurry whose particles are in a narrow size distribution. Further, the beads are etched during milling, so that their dispersing ability is decreased. In fact, because the slurries produced are significantly different from each other in particle size and size distribution, a constant polishing ability cannot be expected from the slurries.

In another known preparation process, a fluid is rotated at a high speed by a rotor sold by IKA, Germany and collided with a stator. This technique, even if enhanced relative to the process of U.S. Pat. No. 5,382,272, has a problem in that the stator is etched as a result of the wall collision so that a significant decrease in dispersion capability results.

These conventional techniques all are known to produce particles which have a size of $\mu$m. They are too large to be used in CMP. In particular, they cannot be used as a CMP slurry for shallow trench isolation because $\mu$-scratches, if occurring during the isolation process, cause fatal damages to the function and yield of semiconductor devices.

Another technique relating to a CMP slurry is disclosed in WO Pat. No. 9 747 430. With use in polishing Si wafers, the slurry composition of this patent contains $SiO_2$ as an abrasive, monoethanol amine as a pH-adjusting agent, and additives such as $NH^{4+}$, $Cs^+$ and $Ba^{3+}$. The pH-adjusting agent excludes the plausible possibility that conventional pH-adjusting agents, such as KOH or $NH_4OH$, may diffuse into wafers during a polishing procedure and act as a pollutant. However, this slurry exhibits a relatively slow polishing rate ranging from 1,500 to 2,500 A/min. In addition, nowhere is mentioned a dispersion process for CMP slurry.

U.S. Pat. No. 5,342,609 described a method and apparatus for forming emulsions, in which collisions between oils, cavitation, and shearing stresses are utilized, in combination. The apparatus, called a microfluidizer, is known to be applied for various purposes and superior in emulsification. However, it has not yet been applied for the dispersion of particles, such as metal oxides.

An example of the prior art using the microfluidizer is found in U.S. Pat. No. 5,342,609. According to the patent, a particle mixture comprising calcium and oxianions is dispersed in a microfluidizer, so as to produce a composition with a particle size of 5 nm. However, this composition is used for diagnostic purposes, such as MRI, X-ray and ultrasound, but not for semiconductor polishing.

SUMMARY OF THE INVENTION

Therefore, it is an object of the present invention to overcome the problems encountered in prior arts and to provide a process for preparing a metal oxide slurry useful in semiconductor chemical mechanical polishing (CMP), whereby the metal oxide slurry, which is dispersed as a result of the complex occurrence of counter collisions, wall collisions and cavitation, can be allowed to be narrow in particle size distribution and superior in dispersion stability and polishing rate in addition to showing an exceptionally decreased μ-scratch frequency.

In accordance with the present invention, the above object could be accomplished by a provision of a process for preparing a metal oxide CMP slurry suitable for semiconductor devices, wherein a mixture comprising 1 to 50 weight % of a metal oxide and 50 to 99 weight % of water is mixed in a pre-mixing tank, transferred to a dispersion chamber with the aid of a transfer pump, allowed to have a flow rate of not less than 100 m/sec by pressurization at 50 atm with a high pressure pump, and subjected to counter collision for dispersion through two orifices which are designed to face each other in the dispersion chamber.

BRIEF DESCRIPTION OF THE DRAWINGS

The above and other objects and aspects of the invention will become apparent from the following description of embodiments with reference to the accompanying drawings in which.

DETAILED DESCRIPTION OF THE INVENTION

The application of the preferred embodiments of the present invention is best understood with reference to the accompanying drawings.

Figure 1:
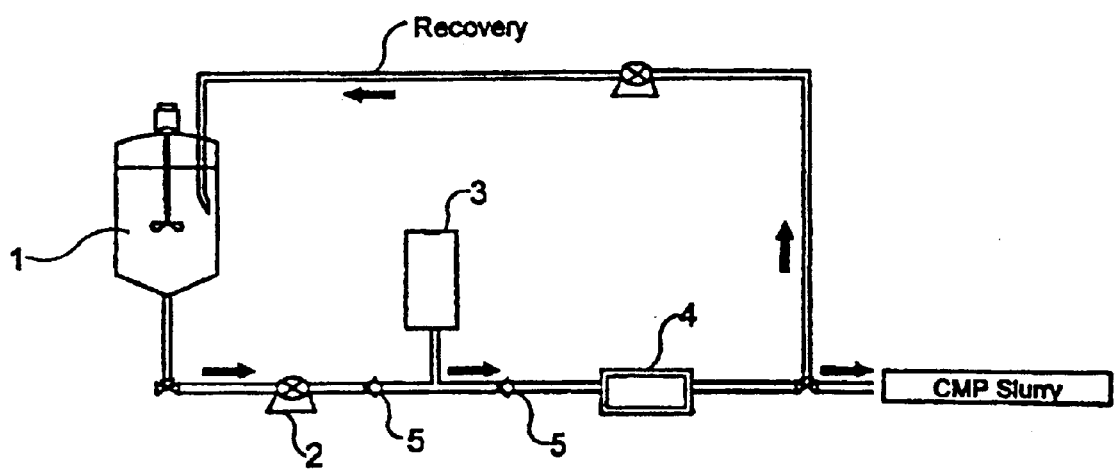
FIG. 1 is a schematic view showing a dispersion process of metal oxide slurries, according to the present invention.

FIG. 1 is a schematic process view showing the dispersion of CMP slurry according to the present invention. As shown in this figure, after being homogeneously mixed with water in a pre-mixing tank 1, metal oxide slurry is introduced to a line connected with a high pressure pump 3 with the aid of a transfer pump 2. With a flow speed of not less than 100 m/sec by the accelerating action of the high pressure pump 3, the slurry is injected through two orifices into a dispersion chamber 4 in which the slurry is dispersed as a result of the complex occurrence of counter collisions, wall collisions and cavitation. Wall collision means collision of fluid and inner wall of the orifice. Counter collision means collision between fluids which face each other. Cavitation means phenomenon of decrease of pressure when fluid passes though a channel from a large diameter to a small diameter. In the process of the present invention, it is designed that the particles which remain larger than 500 nm in diameter after the dispersion is done by the collision should be recovered by a recovery means to stabilize the final slurry. Check valves 5 are provided in front of and at the back of the high pressure pump 3, so as to prevent the slurry from flowing backward.

In general, the dispersion of metal oxides is dependent on their surface area. As their surface area is larger, the metal oxides are better dispersed. Available in the present invention are any metal oxides that have a surface area from 20 to 300 m²/g when being oxidized at a temperature of 1,000° C. or higher. Preferable is one which is selected from the group consisting of $SiO_2$, $CeO_2$, $ZrO_2$ or the mixtures thereof.

The selected metal oxide is mixed with water in the pre-mixing tank in such a way that the resulting metal slurry has a solid content of 1 to 50 weight % and preferably 5 to 30 weight %. If the premixed slurry has a solid content less than 1 weight %, a satisfactory dispersion effect cannot be attained. On the other hand, a solid content more than 50 weight % causes a thixotropic phenomenon, resulting in an extreme increase of viscosity.

Before being used in CMP process, this slurry is diluted. For example, it is advantageous in polishing capacity and material cost that the solid content in the diluted metal oxide slurry to be used in a CMP process is controlled into a range of from 10 to 14 weight % for $SiO_2$, from 1 to 5 for $CeO_2$ and from 4 to 8 weight % for $ZrO_2$.

In the present invention, the dispersion degree of the metal oxides is proportional to the accelerated fluid's flow rate which is, in turn, proportional to the pressure of the high pressure pump at an orifice diameter. Hence, metal oxide slurries with various particle size distributions can be obtained simply by controlling the pressure of the high pressure pump.

In accordance with the present invention, the fluid accelerated by the pressurization of the high pressure pump 3 has a flow rate higher than 100 m/sec and preferably 350 m/sec. To accomplish this flow rate, the high pressure pump 3 is required to pressurize at 50 atm for the flow rate of 100 m/sec and at 500 atm for the flow rate of 350 m/sec. Thus, any pressure pump that has a pressure capacity of 50 atm or higher can be used in the present invention.

Via the two orifices 6 which are provided in the dispersion chamber 4, as mentioned above, the fluid accelerated by the high pressure pump is introduced in the dispersion chamber 4 in which the fluid undergoes complex counter collisions, wall collisions and cavitation, to form ultrafine particles. The orifices are made of engineering plastics, glass-reinforced plastics, carbon steel, stainless steel (SUS), ceramic, or diamond with preference to ceramic or diamond in an aspect of durability. However, these examples are only illustrative, but not limitative of the present invention.

In consideration of the compatibility with the high pressure pump and the dispersion efficiency of the slurry, the orifices 6 have a diameter of 0.05 to 0.5 mm and preferably 0.1 to 0.3 mm. For example, if the orifices 6 are below 0.05 mm in diameter, the metal oxide slurry is well dispersed by virtue of the increased acceleration effect under a pressure condition, but a poor result is brought into productivity by decreased throughput per time. On the other hand, if the orifices have a diameter larger than 0.5 mm, productivity is increased, but it is economically unfavorable because there is needed a high pressure pump which has a capacity sufficient to maintain the required flow rate.

Figure 2:
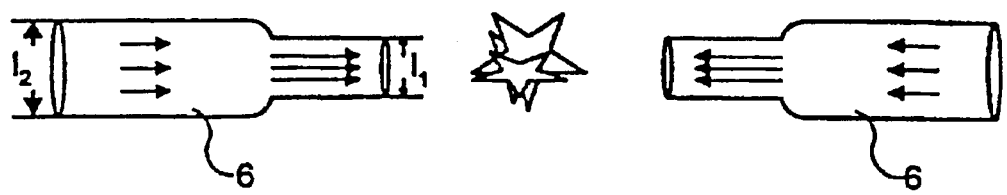
FIG. 2 is a conceptional view showing the fluids are counter collided with each other via two orifices in a dispersion chamber.

As shown in FIG. 2, the orifices have a tubular form and are designed to have an outlet diameter ($l_1$) smaller than an inlet diameter ($l_2$), so as to improve the acceleration effect under a pressure condition. When the outlet diameter ($l_1$) is reduced to half of the inlet diameter ($l_2$), the flow rate increases four times and the fluid leads to cavitation and a better dispersion performance. Mathematically, the production of slurry per time is proportional to the square of the outlet diameter of the orifice and to the square root of the pressure applied. When designing the dispersion process system, the diameters of the orifices and the pressure capacity of the high pressure pump can be determined by taking the treatment rate of the slurry into account.

As for the dispersion degree (ultrafining) of the metal oxides, it is in proportion to the pressure of the high pressure pump 3 and the number of times that the fluid passes through the orifices. In other words, as the pressure increases, the particles are smaller while as the number of pass increases, the particles size distribution is narrower and more uniform.

For $SiO_2$ slurry, which is the most widely used for CMP process, for example, when one pass through the orifices is carried out once at a flow rate of 350 m/sec via two orifices with a diameter of 0.2 mm by a force of 500 atm, there can be obtained particles with an average size from 140 to 150 nm, which are suitable for CMP. Of course, pressurization at higher than 500 atm produces smaller particles, making the particle size distribution narrower. However, the slurry obtained at higher than 500 atm shows the same polishing effects such as in polishing rate and p-scratch frequency, as those of the slurry obtained at 500 atm. Thus, it is advantageous in energy efficiency to select as low a pressure as possible if there are no differences in polishing results. On the other hand, the slurry prepared under a pressure lower than 300 atm is as high in polishing rate as, but produces more $\mu$-scratches than that prepared at 500 atm.

The following examples are set forth to illustrate more clearly the principles and practice of this invention to one skilled in the art. As such, they are not intended to limit the invention, but are illustrative of certain preferred embodiments.

EXAMPLE I 130 g of silica with a surface area of 200 m²/g, such as that commercially available from Degussa, identified as AEROSIL 200, 18 g of a 20% KOH solution, and 860 g of deionized water, were mixed in a teflon-coated premixing tank with a volume of 1 m² and transferred by a transfer pump (diaphram 150 atm) to a dispersion chamber in which the mixture is subjected to counter collision through two ceramic orifices which are designed to face each other and have an inlet diameter of 0.4 mm and an outlet diameter of 0.2 mm by a force of 500 atm with the aid of a high pressure pump (Intensifier pump, 50–1,500 atm), so as to give CMP slurry. The sample from the dispersion chamber was measured for particle size, particle size distribution and average particle size by use of a size analyzer, such as that sold by Malvern under the brand name of ZETASIZER. The results are given in Table 1, below.

EXAMPLES II TO VI

The same procedure as that of Example I was repeated, except for using the pressure of the high pressure pump according to the indication of Table 1, below. The results are given in Table 1.

EXAMPLE VII

The same procedure as that of Example I was repeated, except for using ceria ($CeO_2$, surface area of 30 m²/g) instead of silica. The results are given in Table 1, below.

EXAMPLE VIII

The same procedure as that of Example I was repeated, except for using zirconia ($ZrO_2$, surface area 30 m²/g) instead of silica. The results are given in Table 1, below.

EXAMPLES IX TO XIII

The same procedure as that of Example I was repeated, except that the pressures of the high pressure pump and the number of the pass through the orifices were taken as indicated in Table 1, below. The results are given in Table 1.

EXAMPLE XIV

The same procedure as that of Example I was repeated, except that a 20% KOH solution was not used.

TABLE 1

| No. of Examp. | Metal Oxide | Press. (atm) | No. of Pass | Solid Content (%) | pH | Particle Distribution (nm) | Avg. Particle Size (nm) |
|---|---|---|---|---|---|---|---|
| I | $SiO_2$ | 500 | 1 | 13 | 10.7 | 40~390 | 150 |
| II | $SiO_2$ | 300 | 1 | 13 | 10.9 | 50~520 | 170 |
| III | $SiO_2$ | 800 | 1 | 13 | 10.7 | 30~370 | 150 |
| IV | $SiO_2$ | 1000 | 1 | 13 | 10.7 | 30~350 | 145 |
| V | $SiO_2$ | 1200 | 1 | 13 | 10.7 | 30~350 | 145 |
| VI | $SiO_2$ | 1500 | 1 | 13 | 10.6 | 30~320 | 130 |
| VII | $CeO_2$ | 500 | 1 | 13 | 6.8 | 40~550 | 178 |
| VIII | $ZrO_2$ | 500 | 1 | 13 | 7.3 | 40~500 | 180 |
| IX | $SiO_2$ | 500 | 2 | 13 | 10.8 | 30~350 | 143 |
| X | $SiO_2$ | 500 | 5 | 13 | 10.6 | 30~280 | 135 |
| XI | $SiO_2$ | 500 | 10 | 13 | 10.5 | 30~250 | 120 |
| XII | $SiO_2$ | 1200 | 5 | 13 | 10.5 | 30~300 | 125 |
| XIII | $SiO_2$ | 2500 | 10 | 13 | 10.5 | 30~250 | 110 |
| XIV | $SiO_2$ | 500 | 1 | 13 | 4.5 | 40~390 | 153 |
| XV | $SiO_2$ | 500 | 1 | 18 | 10.5 | 30~370 | 148 |
| XVI | $SiO_2$ | 500 | 1 | 25 | 10.5 | 30~360 | 145 |
| XVII | $SiO_2$ | 500 | 1 | 30 | 10.5 | 30~340 | 143 |

COMPARATIVE EXAMPLES I TO IX 130 g of commercially available silica ($SiO_2$, surface area 200 m²/g), 18 g of 20% KOH solution, and 860 g of deionized water were added, together with 300 g of glass beads with a size of 2 mm, in a 2 liter Dynomill and dispersion was carried out under the dispersion speed and time conditions indicated in Table 2, below. The results are given in Table 2.

COMPARATIVE EXAMPLE X

The same procedure as that of Comparative Example I was repeated, except that ceria ($CeO_2$, surface area 30 $m^2/g$), instead of silica, was used in the absence of 20% KOH solution. The results are given in Table 2, below.

COMPARATIVE EXAMPLE XI

The same procedure as that of Comparative Example I was repeated, except for using zirconia ($ZrO_2$, surface area 30 $m^2/g$) instead of silica. The results are given in Table 2, below.

TABLE 2

| No. of Comp. Examp. | Metal Oxide | Dispersion Rate (rpm) | Dispersion Time (hr) | pH | Particle Size Distribution (nm) | Avg. Particle Size (nm) |
|---|---|---|---|---|---|---|
| I | $SiO_2$ | 1000 | 1 | 10.9 | 50–1200 | 456 |
| II | $SiO_2$ | 1500 | 1 | 10.9 | 50–1200 | 450 |
| III | $SiO_2$ | 2000 | 1 | 10.9 | 50–1100 | 450 |
| IV | $SiO_2$ | 2500 | 1 | 10.8 | 50–950 | 430 |
| V | $SiO_2$ | 3000 | 1 | 10.7 | 50–800 | 420 |
| VI | $SiO_2$ | 2000 | 2 | 10.8 | 50–1100 | 420 |
| VII | $SiO_2$ | 2000 | 5 | 10.9 | 50–1100 | 400 |
| VIII | $SiO_2$ | 3000 | 2 | 10.7 | 50–750 | 370 |
| IX | $SiO_2$ | 3000 | 5 | 10.7 | 50–750 | 350 |
| X | $CeO_2$ | 2000 | 1 | 7.3 | 70–1300 | 570 |
| XI | $ZrO_2$ | 2000 | 1 | 6.7 | 80–1550 | 680 |

TEST EXAMPLE

The slurries obtained in Examples I, II, VII, VIII and Comparative Examples I, X and XI were tested for assessment of polishing performance. p-TEOS coated bare wafers 6 inches thick were polished with the slurries in a Strabaugh Model 6 EC polishing machine under the following abrasion conditions.

Pad type: IC1000/Suba IV Stacked (Rodel)
Platen Speed: 120 rpm
Quill Speed: 120 rpm
Pressure: 6 psi
Back Pressure: 0 psi
Temperature: 25° C.
Slurry Flow: 150 ml/min Polishing was performed for 2 min. The polishing rates were measured from the thickness change of the wafers. As for $\mu$-scratch, it was detected with the aid of a Tencor model KLA machine. For comparison, SS-25, a slurry sold by Cabot, was used as a control.

TABLE 3

Polishing Ability of Slurry

| Slurries | Particle Size Distribution (nm) (Avg.) | Polishing Performance Polishing Rate (A/min) | Nos. of $\mu$-scratches |
|---|---|---|---|
| Example I | 40–390 (150) | 3550 | 0 |
| Example II | 50–520 (170) | 3570 | 12 |
| Example VII | 40–520 (178) | 7210 | 50 |
| Example VIII | 40–500 (180) | 4830 | 42 |
| C. Example I | 50–1200 (456) | 3500 | 158 |
| C. Example X | 70–1300 (570) | 7210 | 290 |
| C. Example XI | 80–1550 (680) | 6230 | 170 |
| SS-25 | 30–390 (160) | 3430 | 123 |

COMPARATIVE EXAMPLE XII and EXAMPLES XVIII~XX

The same procedure as that of Example I was repeated, except that orifices having a different diameter ratio were used to ascertain the dispersion effect according to the ratio of inlet diameter and outlet diameter.

TABLE 4

| | Inlet diameter | Outlet diameter | Inlet diameter/ Outlet diameter | Particle Size Distribution (nm) | Average Particle Size (nm) |
|---|---|---|---|---|---|
| COMPARATIVE EXAMPLE XII | 0.4 | 0.4 | 1 | 40–520 | 172 |
| EXAMPLE XVIII | 0.4 | 0.27 | 1.5 | 40–400 | 160 |
| EXAMPLE I | 0.4 | 0.2 | 2 | 40–390 | 150 |
| EXAMPLE XIX | 0.4 | 0.13 | 3.1 | 30–320 | 135 |
| EXAMPLE XX | 0.4 | 0.1 | 4 | 39–329 | 132 |

As described hereinbefore, the CMP slurry of the present invention, which is prepared by a dispersion process in which a fluid is subjected to counter collisions, wall collisions and cavitation, takes advantages over the slurries prepared by conventional dispersion processes which use bead or rotor and stator, in that the particles of the slurry of the present invention are narrower in particle size distribution, showing an ultrafine size ranging from 30 to 500 nm. In addition, the slurry of the present invention is little or not polluted at all during its preparation and shows no tailing phenomena, so that it is preventive of $\mu$-scratching. Further, the process according to the present invention can be carried out by a simple operation. What is more, the dispersion degree of the slurry is patterned on the pressure and pass number, so that the slurry can be reproduced at a high efficiency. An additional advantage of the process of the present invention resides in the ability to produce slurries in a continuous type and thus, at high productivity.

Although the invention has been described in detail by referring to certain preferred embodiments, it will be understood that various modifications can be made within the spirit and scope of the invention. The invention is not to be limited except as set forth in the following claims.

What is claimed is:

1. A process for preparing a metal oxide CMP slurry suitable for semiconductor devices, comprising the steps:

mixing from about 1 to 50 weight % of a metal oxide and from about 50 to 99 weight % water to form a slurry;

injecting said slurry at a flow rate of not less than 100 in/sec through two orifices which face each other, each of said orifices having an outlet diameter smaller than an inlet diameter, whereby said slurry is dispersed by the complex occurrence of counter collisions, wall collisions and cavitation.

2. The process of claim 1, wherein the orifices are made of ceramic or diamond.

3. The process of claim 1, wherein said metal oxide is selected from the group consisting of silica, ceria, zirconia and mixtures thereof.

4. The process of claim 1, wherein said slurry is pressurized from about 50 atm to about 500 atm.

5. The process of claim 4, wherein the slurry comprises from about 5 to about 30 wt. % metal oxide.

6. The process of claim 4, wherein said flow rate is about 350 m/sec.

7. The process of claim 1, wherein said slurry forced through said orifices produces solid particles which range from about 30 to 550 nm.

8. The process of claim 1, wherein at least one of said orifices has an outlet diameter that is one-half the size of the inlet diameter of that orifice.

9. The process of claim 1, wherein at least one of said orifices has an inlet diameter of 0.4 mm and an outlet diameter of 0.2 mm.

10. The process of claim 1, wherein at least one of said orifices has an inlet diameter of between 0.05 to 0.5 mm.

11. The process of claim 7, wherein said slurry forced through said orifices produces solid particles which range from about 30 to 550 mm.

* * * * *